United States Patent [19]
Turler et al.

[11] Patent Number: 6,019,860
[45] Date of Patent: Feb. 1, 2000

[54] METHOD FOR FIXING TWO ELEMENTS TOGETHER, IN PARTICULAR LINKS OF A METAL WRISTWATCH STRAP

[75] Inventors: Willy A. Turler, Geneva; Jean Schwob, Bassins, both of Switzerland; Wilfried Van Moorleghem, Lubbeek, Belgium

[73] Assignees: Advanced Materials and Technologies, afgekort "A.M.T.", naamloze vennootschap, Herk-De-Stad, Belgium; Gay Freres Vente Et Exportation S.A., Geneva, Switzerland

[21] Appl. No.: 08/973,104
[22] PCT Filed: Jul. 9, 1996
[86] PCT No.: PCT/BE96/00074
§ 371 Date: Dec. 10, 1997
§ 102(e) Date: Dec. 10, 1997
[87] PCT Pub. No.: WO97/03294
PCT Pub. Date: Jan. 30, 1997

[30] Foreign Application Priority Data

Jul. 11, 1995 [BE] Belgium ............................ 09500614

[51] Int. Cl.$^7$ .................. C21D 9/00; F16B 4/00
[52] U.S. Cl. ............ 148/563; 29/896.411; 29/447; 368/280
[58] Field of Search .................... 148/563, 402; 29/447, 896.411; 368/280, 282

[56] References Cited

U.S. PATENT DOCUMENTS

| | | |
|---|---|---|
| 2,737,843 | 3/1956 | Koehl . |
| 3,837,163 | 9/1974 | Fujimori . |
| 3,913,444 | 10/1975 | Otte . |
| 4,036,669 | 7/1977 | Brook et al. . |
| 5,617,377 | 4/1997 | Perret ........................... 368/282 |

FOREIGN PATENT DOCUMENTS

| | | |
|---|---|---|
| 2 306 782 | 11/1996 | France . |
| WO-A-94 23214 | 10/1994 | WIPO . |

*Primary Examiner*—George Wyszomierski
*Attorney, Agent, or Firm*—Bacon & Thomas

[57] ABSTRACT

Method for fixing two elements together, in particular links (1) of a metal wristwatch strap, according to which a metal pin (2) made of a moulding memory alloy with large hysteresis—programmed such that it turns from the martensitic structure to the austenitic structure in a first temperature range which is situated above the service temperature of the elements and whereby its thickness increases, and such that it turns back from the austenitic structure to the martensitic structure in a second temperature range which is situated under the above-mentioned service temperature—is clamped in the martensitic structure in at least one either or not blind hole (3) in at least one of the elements to be linked; the pin (2) is subsequently heated to a temperature higher than the first temperature range, such that the thickness of the pin (2) is increased, whereby the clamping force of the pin (2) in the hole (3) becomes very large; and the pin (2) is finally cooled down to service temperature, characterized in that a pin (2) with a martensitic structure is put in at least one hole (3) having a thickness which is slightly larger than the width of the hole (3).

10 Claims, 1 Drawing Sheet

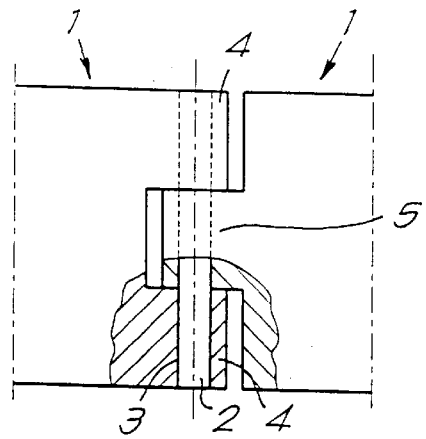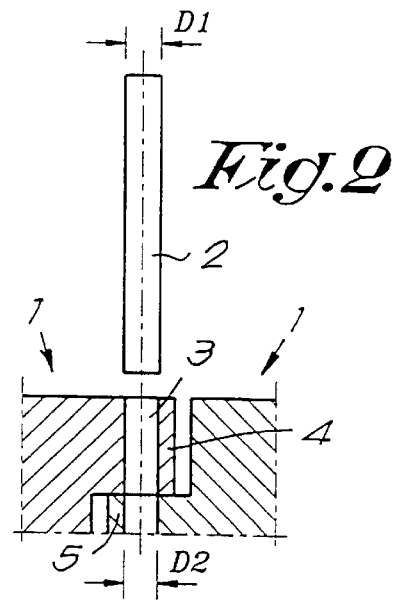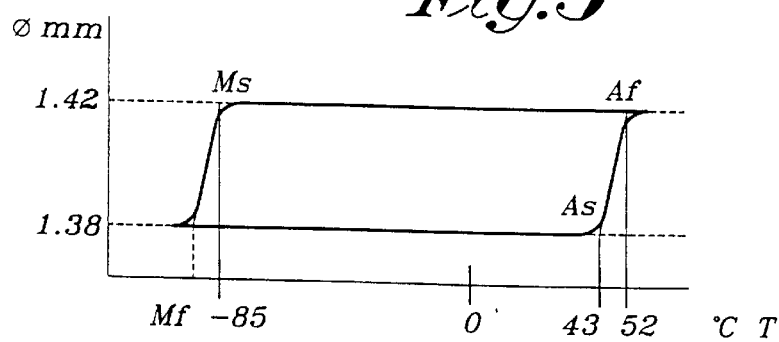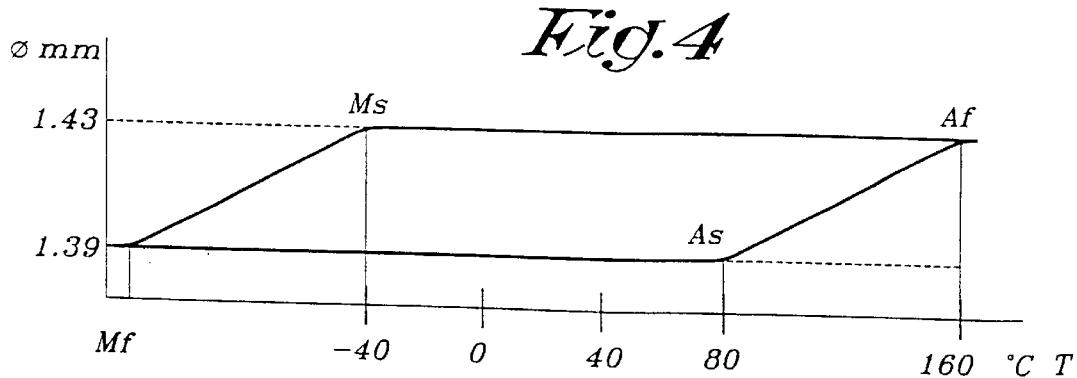

even better than possible
METHOD FOR FIXING TWO ELEMENTS TOGETHER, IN PARTICULAR LINKS OF A METAL WRISTWATCH STRAP The present invention concerns a method for fixing two elements together, in particular links of a metal wristwatch strap, according to which a metal pin made of a moulding memory alloy with large hysteresis—programmed such that it turns from the martensitic structure to the austenitic structure in a first temperature range which is situated above the service temperature of the elements and whereby its thickness increases, and such that it is turns back from the austenitic structure to the martensitic structure in a second temperature range which is situated under the above-mentioned service temperature —is put in the martensitic structure in at least one either or not blind hole in at least one of the elements to be linked; the pin is subsequently heated to a temperature higher than the first temperature range, such that the thickness of the pin is increased, whereby the clamping force between pin and hole becomes very large; and the pin is finally cooled down to service temperature.

Thanks to the use of moulding memory alloys, the mere mechanical clamping of the pins in the holes can be improved, since it is possible to obtain much greater clamping forces.

The working of moulding memory alloys is based on a change in the metal structure, i.e. a martensitic structure changes in an austenitic structure at a certain temperature during heating, and it turns back to the martensitic structure when the temperature drops again. It is possible to associate a specific shape or diameter of a pin made of such material with each of the metal structures. This implies that during the transition from a low to a high temperature or vice versa, the shape or diameter of the pin will change or, if this change is prevented during the heating, a force will be created.

When such a memory alloy is heated, the transition to the austenitic structure and thus the deformation starts, at a temperature $A_s$. This transition lasts until the abovementioned higher temperature $A_f$ is reached. When the alloy is cooled down again, the transition back to the martensitic structure will not start at the latter temperature, but at a lower return temperature, called the martensitic starting temperature $M_s$, which phenomenon is called hysteresis. The return to the martensitic structure is ended at a still lower temperature $M_f$.

Examples of such alloys are: Cu—Zn, Cu—Zn—Al, Cu—Zn—Si, Cu—Au—Zn, Cu—Al, Cu—Al—Ni, Ni—Ti, Ni—Ti—Cu, Ni—Ti—Fe, Ni—Ti—Nb, Ni—Ti—Zr, Ni—Ti—Hf, Fe—Ni—Al, Fe—Ni—Al—Ti, Fe—Ni—Co—Ti, Fe—Mn—Si, Ag—Cd, Au—Cd, Cu—Sn, Cu—Au—Zn, Cu—Zn—Be, Cu—Zr, Ni—Al, Fe—Mn—Si—Cr—Ni, both single crystalline and polycrystalline.

A method for fixing links together whereby use is made of pins made of such moulding memory alloys is described in WO-A-94/23214.

In this known method, pins are used whose thickness is smaller than the width of the holes in the martensitic structure, such that the pins can be put loosely in the holes without any force being required. When the pins have the austenitic structure, they jam in the holes.

However, this jamming is restricted since a considerable part of the increase in thickness of the pin is required to make the pin fill the hole, whereas only a part of the increase, which is prevented when the hole is filled, is used to cause the clamping force in the hole.

Also, the invention aims to provide a method for fixing two elements together, in particular links of a wristwatch strap, making use of a pin made of a moulding memory alloy with which a better clamping is obtained.

This aim is reached according to the invention in that the pin with a martensitic structure has a thickness which is slightly larger than the width of the hole.

This implies that the pin has to be inserted in the hole with a certain force. The entire tendency to an increase in thickness as a result of the transition from the martensitic to the austenitic structure is transformed in clamping force, so that an excellent clamping is obtained, which cannot be obtained when a pin is pressed in the holes in a purely mechanical manner.

It is possible to use a moulding memory alloy which, when returning from the austenitic to the martensitic structure when cooling down, decreases in thickness as of a return temperature, i.e. the martensitic starting temperature, which is lower than the service temperature of the elements.

Preferably, the pin and the hole are round, and the above-mentioned thickness of the pin and width of the hole are diameters.

According to an embodiment of the invention, use is made of a pin made of a memory alloy with an austenitic starting temperature which is higher than 40° C. and a martensitic starting temperature which is lower than −10° C.

Preferably, the above-mentioned austenitic starting temperature is situated between 60 and 80° C., and the martensitic starting temperature is lower than −40° C.

Practically, a pin is used of a memory alloy with an austenitic end temperature which is higher than 80° C. and which is situated for example between 90° C. and 200° C.

BRIEF DESCRIPTION OF THE DRAWINGS

Other particularities and advantages of the invention will become clear from the following description of a method for fixing together two elements, in particular links of a metal wristwatch strap, according to the invention. This description is given as an example only and does not restrict the invention in any way whatsoever. The figures refer to the accompanying drawings, where:

FIG. 1 shows a partially cut-out side view of a part consisting of two links of a wristwatch strap which are connected to a pin applied according to the method of the invention;

FIG. 2 shows a side view of a part of a link and the pin during the application of the method according to the invention;

FIG. 3 shows a diagram with the taper of the diameter of the pin as a function of the temperature;

FIG. 4 shows a diagram analogous to that of FIG. 3 but with reference to another metal for the pin.

DETAILED DESCRIPTION OF THE INVENTION

FIG. 1 shows parts of two links 1 of a wristwatch strap which are connected to a round, metal pin 2. This pin 2 is jammed in round holes 3 which are provided diagonally through two protrusions 4 of one of the links. The other link 1 is bent with one lip 5 around the pin 2.

A good clamping is obtained if the force required to draw a pin 2 from the hole 3 is larger than 175 Newton. This would normally also be the force required to push the pin in the hole. According to the invention, such a good clamping can be obtained without having to exert said great force on the pin 2 to put it in the hole 3, or even better than possible in a purely mechanical manner.

This is possible according to the invention by using a pin 2 made of a moulding memory alloy which has been especially programmed to this end.

One can take a known moulding memory alloy, such as an alloy from the following series: Cu—Zn, Cu—Zn—Al, Cu—Zn—Si, Cu—Au—Zn, Cu—Al, Cu—Al—Ni, Ni—Ti, Ni—Ti—Cu, Ni—Ti—Fe, Ni—Ti—Nb, Ni—Ti—Zr, Ni—Ti—Hf, Fe—Ni—Al, Fe—Ni—Al—Ti, Fe—Ni—Co—Ti, Fe—Mn—Si, Ag—Cd, Au—Cd, Cu—Sn, Cu—Au—Zn, Cu—Zn—Be, Cu—Zr, Ni—Al, Fe—Mn—Si—Cr—Ni, both single crystalline and polycrystalline.

Loose pins, or a thread, for example thread wound on a reel which is cut into pieces of the required length as pins just before use, are programmed according to the usual techniques, i.e. subjected to a thermomechanical treatment, so as to recall another shape when the alloy is brought from the martensitic structure at a lower temperature to the austenitic structure at a higher temperature. In the case of a pin or thread, this deformation implies a change in length and diameter, namely a shrinkage of the length of the thread and an increase in diameter if the thread was elongated in the martensitic structure. The change in length is taken into account when the required length of the pins 2 is determined, whereas the change in diameter is used to obtain the clamping force of the pin 2 in a hole 3.

One makes sure that the diameter D1 of the pin 2 or of the thread of the programmed memory alloy is slightly larger than the diameter D2 of the hole 3 when the pin has a martensitic structure. Of course, the diameter of the pin 2 is even larger when it has an austenitic structure.

Further, one makes sure that the temperature $A_s$ at which the transition to the austenitic structure begins, and which thus forms the end of the temperature range in which the alloy has the martensitic structure, is as high as possible and in any case higher than the maximum service temperature of the pin, i.e. for a pin in a wristwatch strap the maximum environmental temperature.

In practice, this temperature As is in any case selected higher than 40° C., preferably between 60° C. and 80° C. or even higher than 80° C. The complete austenitic structure as obtained at the austenitic end temperature $A_f$ which is preferably higher than 80° C., for example between 90° C. and 200° C. When the alloy is cooled down again, the transition back to the martensitic structure will not take place at this end temperature $A_f$, but at a lower return temperature $M_s$ which has to be as low as possible, and in any case lower than the normal service temperature. This implies that the hysteresis of the alloy must be as large as possible. Preferably, the temperature $M_s$ is significantly lower than 0° C., for example lower than −10° C. and even −40° C. The return to the martensitic structure is ended at the even lower temperature $M_f$.

The pins 2 or the thread of which the pins 2 are cut are kept at a temperature lower than the austenitic starting temperature $A_s$. If thread is used, pins 2 are cut off.

A pin 2, having a diameter D1 which is somewhat larger than the diameter D2 of the holes 3, and which has a martensitic structure, is pressed with a certain force, which is considerably smaller, however, than the required clamping force, through one of the two holes 3 of a link 1 into the other hole 3.

To this end, use can be made of the usual pressing devices, for example of a hydraulic piston mechanism.

The pin 2 is then heated to a temperature which is higher than the austenitic starting temperature $A_s$. As a result, the pin 2 passes from the original martensitic structure to the austenitic structure, and its diameter would thereby increase if it could expand freely. The increase in diameter of the part of the pin 2 which sticks in the hole 3 is prevented by the protrusion 4 of the link 1, however, so that there is a very large tension of this end in the hole 3, as a result of which this end is clamped very tightly in the hole 3.

Said clamping is maintained for the entire temperature range between the warming-up temperature and the end temperature $M_f$ of the return to the martensitic structure, i.e. for all normal service temperatures to which the wristwatch strap is subjected. Tensile forces of more than 175 Newton are required to draw the pin 2 out of the hole 3 in this temperature range.

For alloys on a Fe—Mn—Si basis, the above-mentioned clamping is maintained for the entire temperature range under the warming-up temperature.

Since, during the transition from the martensitic to the austenitic structure, not only the diameter increases but the length also decreases, this must be taken into account when determining the length of the pins 2 before the application, and said length must be selected for example some 5% larger.

The most critical temperature is of course the starting temperature As of the transition to the austenitic structure, whereas also the return temperature $M_s$ is important. These temperatures depend on the alloy selection, and especially on the thermomechanical treatment and thus the programming to which the alloy has been subjected.

FIGS. 3 and 4 show two examples of the taper of the diameter as a function of the temperature of a pin 2 designed to be clamped in a hole of 1.37 mm. The pin 2 was made of a thread of a memory alloy with an original diameter of 1.72 mm which, after deformation and annealing, had a diameter of 1.44 mm. In the martensitic condition, the thread was deformed to a diameter of 1.38 mm, 1.39 mm respectively, after which a pin was cut from the thread.

The pin 2 to which FIG. 3 refers, is provided in the hole 3 at room temperature, and thus with a diameter of 1.38 mm, after which the pin is heated to 52° C. As of 43° C., the structural transition begins. The original deformation, which amounted to 8.2%, decreases to 2.8% when the pin is heated freely, and the diameter increases to 1.42 mm. In the hole 3, the deformation is restricted, which implies a large tension. This tension was maintained over a temperature range between 52 and −85° C.

The latter $A_s$ temperature of 43° C. is still relatively low, and thanks to a suitable thermomechanical treatment, consisting of a larger deformation of the martensite, or thanks to the stabilisation of this phase, said $A_s$ temperature was increased to 80° C. for the pin according to FIG. 4. However, said pin 2 has to be heated up to 160° C. after it has been applied in the hole 3. The diameter of the pin 2 increased from 1.39 mm to 1.43 mm, there where it could dilate freely. In the hole 3, a tension was created in the pin 2, which was maintained between 160° C. and −40° C.

In the above-described manners, applying pins is very easy and simple, whereas excellent clamping of the pins in the holes is obtained for a large temperature range. Only a reduced force and heating are required. With industrially produced pins, their cost price may be relatively low.

The invention is by no means limited to the above-described embodiments; on the contrary, many changes can be made to said embodiments while still remaining within the scope of the invention, among others as far as shape and dimensions of the parts used for the realisation of the invention are concerned.

In particular, the pin and the hole must not necessarily be round.

We claim:

1. Method for linking two elements together, comprising placing a metal pin having a martensitic structure in at least one hole in at least one of the elements to be linked, said metal pin with the martensitic structure having a thickness which is slightly larger than the width of the hole, and said metal pin made of a moulding memory alloy with a large hysteresis such that it turns from the martensitic structure to an austenitic structure in a first temperature range which is above the service temperature of the elements and turns back from the austenitic structure to the martensitic structure in a second temperature range which is lower than said service temperature; subsequently heating the pin so that the pin passes through said first temperature range such that the thickness of the pin is increased and whereby a clamping force of the pin in the hole becomes very large; and cooling the pin down to said service temperature such that the pin remains in said austenitic structure.

2. Method according to claim 1, wherein said memory alloy, when returning from the austenitic to the martensitic structure when cooling down, decreases in thickness as of a martensitic starting temperature $M_s$ which is lower than the service temperature of the pin.

3. Method according to claim 1, wherein the pin and the hole are round, and the said thickness of the pin and width of the hole are diameters thereof.

4. Method according to claim 1, wherein said memory alloy has an austenitic starting temperature $A_s$ higher than 40° C.

5. Method according to claim 4, wherein said $A_s$ temperature is between 60° C. and 80° C.

6. Method according to claim 1, wherein said memory alloy has an austenitic end temperature $A_f$ which is higher than 80° C.

7. Method according to claim 6, wherein the $A_f$ temperature is between 90° C. and 200° C.

8. Method according to claim 1, wherein said memory alloy has a martensitic starting temperature $M_s$ which is lower than −10° C.

9. Method according to claim 1, wherein said memory alloy has a martensitic starting temperature $M_s$ which is lower than −40° C.

10. Method according to claim 1, wherein said hole is a blind hole.

* * * * *